(12) United States Patent
Aoki et al.

(10) Patent No.: US 10,079,894 B2
(45) Date of Patent: *Sep. 18, 2018

(54) METHOD AND APPARATUS FOR DYNAMIC DESTINATION ADDRESS CONTROL IN A COMPUTER NETWORK

(71) Applicant: International Business Machines Corporation, Armonk, NY (US)

(72) Inventors: Kentaro Aoki, Kanagawa-ken (JP); Yukinobu Moriya, Tokyo (JP); Naoto Shimizu, Kanagawa-ken (JP); Shinichiroh Saitoh, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/131,400

(22) Filed: Apr. 18, 2016

(65) Prior Publication Data

US 2016/0234315 A1 Aug. 11, 2016

Related U.S. Application Data

(63) Continuation of application No. 14/736,471, filed on Jun. 11, 2015, now Pat. No. 9,374,392, which is a (Continued)

(30) Foreign Application Priority Data

Jul. 22, 2009 (JP) .................................. 2009-171020

(51) Int. Cl.
*H04L 29/06* (2006.01)
*H04L 29/08* (2006.01)
(Continued)

(52) U.S. Cl.
CPC ........ *H04L 67/141* (2013.01); *H04L 43/0876* (2013.01); *H04L 61/103* (2013.01);
(Continued)

(58) Field of Classification Search
CPC ... H04L 63/08; H04L 65/1069; H04L 63/102; H04L 63/0876
(Continued)

(56) References Cited

U.S. PATENT DOCUMENTS 6,321,336 B1 11/2001 Applegate et al.
6,654,807 B2 * 11/2003 Farber .................... G06F 9/505
707/E17.119
(Continued)

FOREIGN PATENT DOCUMENTS

JP 07281980 A 10/1995
JP 11136274 A 5/1999
(Continued)

OTHER PUBLICATIONS

Bray et al., "Extensible Markup Language (XML) 1.0 (Fifth Edition)", WC3 Recommendation, Nov. 26, 2008, 47 pages.
(Continued)

*Primary Examiner* — Harunur Rashid
(74) *Attorney, Agent, or Firm* — Lance I. Hochhauser; Isaac J. Gooshaw

(57) ABSTRACT

An arrangement to direct a packet sent out from an arbitrary apparatus connected to a network to a predetermined authentication server without changing the configuration of a computer network. A packet transmitted from apparatus, such as a personal computer, newly connected to the network, is guided to an authentication server via communication control apparatus. The communication control apparatus replaces a MAC address of the destination addresses of another server, which is included in the ARP cache of the
(Continued)

personal computer, with the MAC address of the communication control apparatus to guide the packet from the personal computer to the communication control apparatus. The communication control apparatus further transmits the received packet to a predetermined authentication server.

21 Claims, 9 Drawing Sheets

Related U.S. Application Data continuation of application No. 13/965,908, filed on Aug. 13, 2013, now Pat. No. 9,160,771, which is a continuation of application No. 12/790,088, filed on May 28, 2010, now abandoned.

(51) Int. Cl.
*H04L 12/26* (2006.01)
*H04L 29/12* (2006.01)

(52) U.S. Cl.
CPC .......... *H04L 61/25* (2013.01); *H04L 61/6022* (2013.01); *H04L 63/08* (2013.01); *H04L 63/0876* (2013.01); *H04L 63/102* (2013.01); *H04L 65/1069* (2013.01); *H04L 65/1073* (2013.01)

(58) Field of Classification Search
USPC .................. 726/3, 12; 709/217, 224, 245
See application file for complete search history.

(56) References Cited

U.S. PATENT DOCUMENTS

| | | |
|---|---|---|
| 6,874,147 B1 | 3/2005 | Diamant |
| 6,971,044 B2 | 11/2005 | Geng et al. |
| 7,093,288 B1 | 8/2006 | Hydrie et al. |
| 7,124,197 B2 | 10/2006 | Ocepek et al. |
| 7,174,390 B2 | 2/2007 | Schuller et al. |
| 7,231,430 B2 | 6/2007 | Brownell et al. |
| 7,370,273 B2 | 5/2008 | Beyer et al. |
| 7,448,076 B2 | 11/2008 | Ocepek et al. |
| 7,474,655 B2 | 1/2009 | Aoki et al. |
| 7,725,932 B2 | 5/2010 | Aoki et al. |
| 7,912,846 B2 | 3/2011 | Kawabe et al. |
| 7,974,984 B2 | 7/2011 | Reuther |
| 7,996,894 B1 * | 8/2011 | Chen .................. H04L 63/02 370/389 |
| 8,914,370 B2 | 12/2014 | Mishina et al. |
| 8,974,370 B2 | 3/2015 | Chechik |
| 9,160,771 B2 | 10/2015 | Aoki et al. |
| 9,374,392 B2 | 6/2016 | Aoki et al. |
| 2003/0048783 A1 | 3/2003 | Tateoka |
| 2003/0177118 A1 | 9/2003 | Moon et al. |
| 2004/0054926 A1 | 3/2004 | Ocepek et al. |
| 2004/0088571 A1 | 5/2004 | Jerrim et al. |
| 2006/0059552 A1 * | 3/2006 | Aoki .................. H04L 29/12009 726/13 |
| 2006/0288015 A1 | 12/2006 | Schirripa et al. |
| 2007/0061713 A1 | 3/2007 | Chidlovskii et al. |
| 2008/0084820 A1 * | 4/2008 | Aoki .................. H04L 29/12028 370/231 |
| 2009/0007254 A1 | 1/2009 | Aoki et al. |
| 2011/0023087 A1 | 1/2011 | Aoki et al. |
| 2012/0109960 A1 | 5/2012 | Mishina et al. |
| 2015/0281207 A1 | 10/2015 | Aoki et al. |

FOREIGN PATENT DOCUMENTS

| | | |
|---|---|---|
| JP | 2000003366 A | 1/2000 |
| JP | 2001014326 A | 1/2001 |
| JP | 2001191743 A | 7/2001 |
| JP | 2002318739 A | 10/2002 |
| JP | 2003030227 A | 1/2003 |
| JP | 2003273936 A | 9/2003 |
| JP | 2003289338 A | 10/2003 |
| JP | 2003308327 A | 10/2003 |
| JP | 2003348113 A | 12/2003 |
| JP | 2004118379 A | 4/2004 |
| JP | 2004240231 A | 8/2004 |
| JP | 2005227851 A | 8/2005 |
| JP | 2005250820 A | 9/2005 |
| JP | 2005251175 A | 9/2005 |
| JP | 2006074705 A | 3/2006 |
| JP | 2007052556 A | 3/2007 |
| JP | 2007336401 A | 12/2007 |
| JP | 2008507789 A | 3/2008 |
| JP | 4082613 B2 | 4/2008 |
| JP | 2008084113 A | 4/2008 |
| JP | 2008541223 A | 11/2008 |
| JP | 2011029749 A | 2/2011 |
| JP | 2012098797 A | 5/2012 |
| JP | 5090408 B2 | 12/2012 |
| JP | 5496853 B2 | 5/2014 |

OTHER PUBLICATIONS

Gao et al., "W3C XML Schema Definition Language (XSD) 1.1 Part 1: Structures", W3C Candidate Recommendation, Jul. 21, 2011, 257 pages.
Kashima et al., "Marginalized Kernels Between Labeled Graphs", Proceedings of the Twentieth International Conference on Machine Learning (ICML-2003), Aug. 2003, pp. 321-328, vol. 20, No. 1.
Peterson et al., "W3C XML Schema Definition Language (XSD) 1.1 Part 2: Datatypes", W3C Candidate Recommendation, Jul. 21, 2011, 159 pages.
Saito et al., "Classification Method of Tree Data Reflecting Structual Similarity and Contents Similarity," The Institute of Electronics, Information and Communication Engineers, IEICE Technical Report, Jun. 2006, pp. 7-12, vol. 106, No. 99.
"Cisco NAC (Network Access Control)", Printed Apr. 8, 2010, 2 pages, <http://www.cisco.com/web/JP/product/hs/security/cca/index.html>.
"IBM Client security solution", translation provided Apr. 28, 2010, 2 pages, <http://www-935.ibm.com/services/jp/index.wss/offering/its/a1009288>.
"IBM client security solution detail", translation provided Apr. 28, 2010, 2 pages, <http://www-935.ibm.com/services/jp/index.wss/detail/its/a1011153?cntxt+a1009288>.
"Microsoft NAP (Network Access Protection)", © 2010 Microsoft Corporation, 4 pages, <http://www.microsoft.com/japan/windowsserver2008/technologies/network-access-protection.mspx>.
"NEC Caps/Suite", Dec. 2006, 7 pages, <http://www.nec.co.jp/cced/capssuite/images/capssuite.pdf>.
"Solution Net'Attest Security Filter", Mar. 2008, 14 pages, <http://www.soliton.co.jp/support/hardware/netattest-sfps/public/sf-v20x/Net%27AttestSecurityFilterV20-Users Guide-Rev5.pdf>.
"Trend Micro Network Virus Wall Enforcer", © 2006 by Trend Micro Incorporated, 4 pages, <http://jp.trendmicro.com/imperial/md/content/jp/products/enterprisebusinesssolutions/nvw-tm-d002.pdf>.

* cited by examiner

| IP ADDRESS | MAC ADDRESS |
|---|---|
| 1:1:1:1 | a:a:a:a:a:a |
| 1:1:1:2 | b:b:b:b:b:b |
| 1:1:1:3 | c:c:c:c:c:c |
| 1:1:1:4 | d:d:d:d:d:d |

METHOD AND APPARATUS FOR DYNAMIC DESTINATION ADDRESS CONTROL IN A COMPUTER NETWORK

BACKGROUND OF THE INVENTION

1. Field of the Invention

The present invention relates to a method and apparatus for dynamically controlling destinations of packets in a computer network and, in particular, to a method and apparatus for changing an address of a controlled apparatus by giving an instruction to transfer packets to be originally transmitted from the controlled apparatus to a destination apparatus, to another apparatus having a destination address different from the original destination address, for example, via data transferring apparatus.

2. Background and Related Art

A computer network is configured in a manner that the types and the number of devices can be flexibly changed, and this enhances the convenience of information processing for individual users. For example, a user can flexibly achieve work by possessing a portable terminal, such as a portable computer, and appropriately connecting the portable terminal to a network.

However, it is necessary to give consideration so that such flexible operation does not adversely affect the operation, efficiency, security and safety of a network. For example, portable terminals with malicious code that may act to harm the operation, efficiency, security or safety of a network need to be identified and precluded from connection.

Recently, enterprises, such as organization networks, have been implementing general security policies that apply to all activities in the organization. A network security policy may, in particular, be implemented and used for the purpose of preventing occurrence of the network problems identified above.

A network security policy may include, for example, conditions which are implemented by a network administrator and which are to be satisfied by devices connected to the network. Under such a security policy, only devices in conformity with the policy are permitted access to the network.

In order to realize this purpose, a quarantine/authentication system may, for example, be used for excluding devices that do not satisfy a security policy established for an intra-organization network. A quarantine/authentication system typically may use various approaches. For example, one approach is to use a validating function, which is for validating the security policy of each device. Another approach is to use a network control function for restrictions or allowing access to a network.

SUMMARY OF THE PRESENT INVENTION

In accordance with the present invention, network access is controlled by employing a packet guiding unit or a packet redirection unit in an existing network so that, for example, a network operation is carried out to redirect data transmitted from a controlled terminal to a desired address, as for example, the address of an authentication server or any other designated server at a desired time.

The present invention is applicable to a computer network connected at least to a first apparatus (for example, a first server) and a second apparatus (for example, an authentication server or any other designated server). Typically, a third apparatus (for example, a portable computer) is connected to the computer network, and the third apparatus stores at least the address of the first apparatus in a corresponding storage device, and transmits and receives data to and from the first apparatus on the basis of the stored address.

The present invention provides a communication controller connectable to such a computer network. The communication controller includes an address replacement unit and a data transfer unit. When the third apparatus is connected to the computer network, the address replacement unit transmits an instruction to the third apparatus for replacing the address of the first apparatus stored in the storage device corresponding to the third apparatus with the address of the data transfer unit. The third apparatus transmits data to be transmitted to the first apparatus to the data transfer unit on the basis of the data transfer unit address received during replacement. The data transfer unit then transfers data received from the third apparatus to the second apparatus, such as, an authentication server.

The communication controller may be further provided with an apparatus detection unit. The apparatus detection unit monitors data transmitted on the computer network, detects at least the addresses of the third apparatus and the data transfer unit, and stores the addresses into a storage device corresponding to the apparatus detection unit. Then, the address replacement unit performs replacement on the basis of the addresses of the third apparatus and the data transfer unit in the storage device corresponding to the apparatus detection unit.

In the communication controller, when the third apparatus is connected to the computer network, the address replacement unit may transmit an instruction to the second apparatus, for replacing the address of the third apparatus in a storage device corresponding to the second apparatus with the address of the data transfer unit after the second apparatus stores the address of the third apparatus into the corresponding storage device. The second apparatus may transmit data to be transmitted to the third apparatus, to the data transfer unit on the basis of the address after the replacement.

The network described above may include a router, and the communication controller may be connected with the second apparatus via the router. The third apparatus may be connected to the second apparatus via the router. The following is also possible. When the third apparatus is connected to the computer network, the router stores the address of the third apparatus into a corresponding storage device, the address replacement unit transmits an instruction to the router for replacing the address of the third apparatus in the storage device corresponding to the router with the address of the data transfer unit and the router transmits data to be transmitted originally to the third apparatus, to the data transfer unit.

Furthermore, the first to third apparatuses and the communication controller may transmit and receive data in accordance with the TCP/IP protocol. Each of the address of the first apparatus and the address of the data transfer unit includes an IP address and a Media Access Control (MAC) address, and the address replacement unit may replace the MAC address between the two addresses of the first apparatus, with the MAC address of the data transfer unit. The address replacement unit may perform the replacement of the MAC addresses in accordance with the Address Resolution Protocol (ARP).

Furthermore, the second apparatus may hold predetermined apparatus authentication criteria and have function of deciding whether or not the first apparatus satisfies the apparatus authentication criteria. The second apparatus may be a "sorry" server.

Furthermore, the present invention provides a communication control method and apparatus in a computer network which is connected to at least first and second apparatuses and to which a third apparatus is further connectable, the third apparatus storing at least the address of the first apparatus in a corresponding storage device and performing transmission and receipt of data to and from the first apparatus on the basis of the stored address. In the communication control method and apparatus: (1) the address replacement unit transmits an instruction to the third apparatus for replacing the address of the first apparatus stored in the storage device corresponding to the third apparatus with the address of the data transfer unit when the third apparatus is connected to the computer network; (2) the third apparatus transmits data to be originally transmitted to the first apparatus, to the data transfer unit on the basis of the address after the replacement; and (3) the data transfer unit transmits the data received from the third apparatus to the second apparatus.

Other characteristics and features of the present invention will be apparent from the description in Best Mode for Carrying Out the Invention below.

DETAILED DESCRIPTION OF THE DRAWINGS

Figure 1:
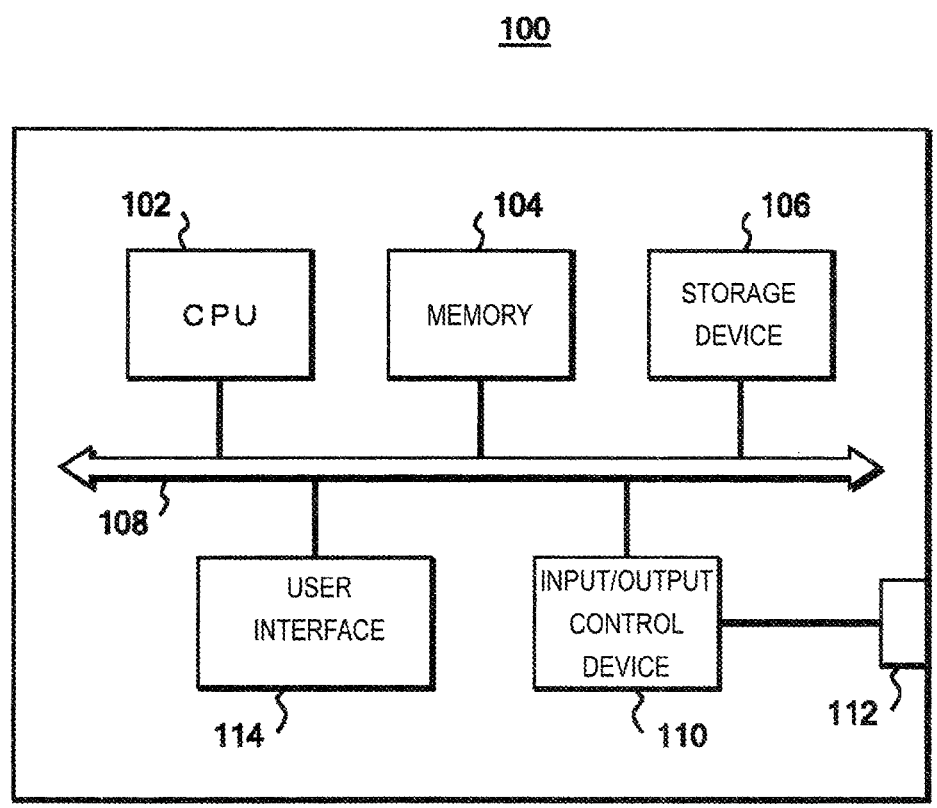
FIG. 1 is an overall system view of a hardware arrangement embodying a communication controller 100 in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Portions of the program code may execute on the user's computer or terminal, partly on the user's computer or terminal as a stand-alone software package, partly on the user's computer and partly on remote computers or servers or all on remote computers or servers. In the latter scenarios, the remote computers may be connected to the user's computer through any type of network, including a local area network (LAN) or a wide area network (WAN), or the connection may be made to an external computer (for example, through the Internet using an Internet Service Provider).

Aspects of the present invention are described below with reference to system and flowchart illustrations and/or block diagrams of methods, apparatus (systems) and computer program products according to embodiments of the invention. It will be understood that each block of the flowchart illustration, and combinations of blocks in the flowchart illustrations, can be implemented by computer program instructions. These computer program instructions may be provided to a processor of a general purpose computer, special purpose computer, or other programmable data processing apparatus to produce a machine or system, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or system, other programmable data processing apparatus, or other devices, such as, storage devices, user terminals, or remote computers such as, servers, to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices, to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The systems and flowchart block diagrams in FIGS. 1 to 10, illustrate the architecture, functionality, and operation of possible implementations of systems, methods and computer program products according to various embodiments of the present invention. In this regard, blocks in the system and flowchart block diagrams may represent or embody a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the system and flowchart illustration, and combinations of blocks in the system and flowchart illustration, can be implemented by special purpose hardware-based systems that perform the specified functions or acts, or combinations of special purpose hardware and computer instructions.

Explanation of Terms

As an aid to understanding the general scope of the invention, but not to be taken as limiting, the following terms, as used through this specification and claims, may be described as follows:

Apparatus: All devices that can be connected to a network are included. For example, a server computer, a portable computer, a display, a storage device, an office machine such as a fax machine and a copying machine, a printer, and the like are included. An apparatus may be a virtual apparatus realized by computer software or may refer to a program code arrangement or a group of program code arrangements existing on a computer memory.

Connection: A state in which an apparatus is enabled to perform information communication via a network is expressed as "connected", being distinguished from "connectable" which includes both of an unconnected state and a connected state. The phrase "when connected" means "in the connected state" and may include "being connected at a particular time on a time series" or "being connected during a particular time width". However, it is not limited to these meanings.

Communication controller: The communication controller may include, at least, an address replacement unit and a data transfer unit. These units may be physically distributed and arranged on a network. These units may be implemented in one arrangement to also include an optional apparatus detection unit.

Address: The term refers to the identification number of an apparatus connected to a network. Both single identification numbers and a set of multiple identification numbers corresponding to multiple protocols are included. For example, such a set may be the set of an IP address and MAC address.

Corresponding storage device: A storage device corresponding to an apparatus is a storage device which the apparatus can access to record or retrieve information, and the type and the implementation place thereof is not limited.

Data: The term is used in a general meaning as used in the industry. Of course, a data packet transmitted on a network is also included.

Replacement: The term is used in a general meaning used in the industry. Various realization methods are conceivable, such as erasing an original address and newly writing a new address, and overwriting an original address with a new address.

In the description below, it is assumed that a network and various apparatuses connected thereto perform data communication in accordance with the TCP/IP protocol. However, the communication protocol is not limited thereto as far as each operation of this invention is realized.

Hardware Configuration

FIG. 1 is an overall system view of a hardware configuration for embodying a communication controller 100, in accordance with the present invention.

The communication controller 100 comprises a CPU 102, a memory 104, a storage device 106, an input/output control device 110, a user interface 114, a bus 108 connecting the same and a communication port 112 to the network. The code of a communication control program may be stored in the storage device 106, or it may be introduced into the memory 104 via the communication port 112 and the input/output control device 110. The communication control program code may be loaded into memory 104 and executed by CPU 102, or it may be executed by CPU 102 as it is still stored in storage device 106. The memory 104 may be used as a temporary storage memory for any of a variety of purposes. The user interface 11 is used to display the operation state of the communication controller 100 and/or as an input terminal for providing operation control.

The communication control program code can be divided into multiple parts and recorded in multiple storage media. For example, divided portions of the control program code may be stored in storage media in other information processing apparatuses connected to the communication controller 100 via communication port 112 and a computer network (not shown) connected thereto. In such an arrangement, CPU 102 may cause portions of the divided code to be executed in cooperation with one another. To distribute divided code to multiple apparatus and cause the code to cooperate with one another may be embodied, for example, in a client/server system. Which portions of the code each apparatus should execute and which function each apparatus should realize may be appropriately selected when such system is designed. The present invention contemplates any of a variety of such forms.

The communication controller 100 of FIG. 1 may be configured so that it is physically separated into units of functional blocks as described below. Where such is the case, hardware, similar to that shown in FIG. 1, is arranged for each functional block, and the functional blocks cooperate with one another via their communication ports akin to communication port 112 in FIG. 1.

Each of the components described above is shown as an example, and all the components are not necessarily indispensable components of the present invention. Though an operating system which operates to control the communication controller is not indispensable, an operating system which supports a graphic user interface multi-window environment as a standard capability, such as Windows®, XP®, AIX®, Linux®, or other operating systems, such as µITRON, are possible. The present invention is not limited to a particular operating system environment.

System Configuration

Next, the functional block diagram of the operation of the communication controller 100 will be described with reference to FIG. 2. The functional blocks shown in FIG. 2 may be realized by the hardware illustrated in FIG. 1. However, each of them is a logical functional block, and it is not necessarily meant that each of them is realized by discrete hardware or software. Each of the functional blocks may be embodied by a separate independent piece of hardware or by the cooperation of pieces of hardware, or by common hardware or software. As for an address, it is assumed that, when the units are realized by separate pieces of hardware that cooperate with one another via a network, each unit has an inherent address. Where all the units are included in the same apparatus and cooperate with one another, the address of each unit refers to the address of the apparatus.

In a preferable embodiment of the present invention, the communication controller 100 includes an input/output control unit 202, an address replacement unit 204 (also called a packet guiding unit), a data transfer unit 206 (also called a redirector), an apparatus detection unit 208 (also called a sensor) and an address management unit 210.

The input/output control unit 202 appropriately transmits incoming data from an external network to the address replacement unit 204, the data transfer unit 206 and the apparatus detection unit 208, and sends out data from these units to an external network. The input/output control unit 202 may be implemented, for example, as a network interface card (NIC). Typically, it is desirable that the input/output control unit 202 is connected to a normal port or a mirror port of a switch, or a network tap (a data tapping device for sending communication data flowing on a network to various kinds of apparatus), but the input/output control unit 202 is not limited to such function.

The address replacement unit 204 preferably rewrites a part of contents stored in ARP caches of other apparatus via a network, with the use of address resolution protocol (ARP). The ARP is a protocol used to determine an Ethernet® physical address (a MAC address) from an IP address in a TCP/IP network, and it mainly includes an ARP request and an ARP response.

When a particular apparatus connected to a network needs to acquire the MAC address of another apparatus, it broadcasts an ARP request including the IP address of the other apparatus, into the network. The other apparatus having the IP address includes its own MAC address into an ARP response and unicasts the ARP response. In this way, apparatus in the network can acquire the MAC address of other apparatus.

The address replacement unit 204 operates to include a predetermined MAC address into an ARP response and transmits it to the requesting source via the input/output control unit 202. The MAC address may be inputted by the user of communication controller 100 via the user interface 114.

Figures 2, 3:
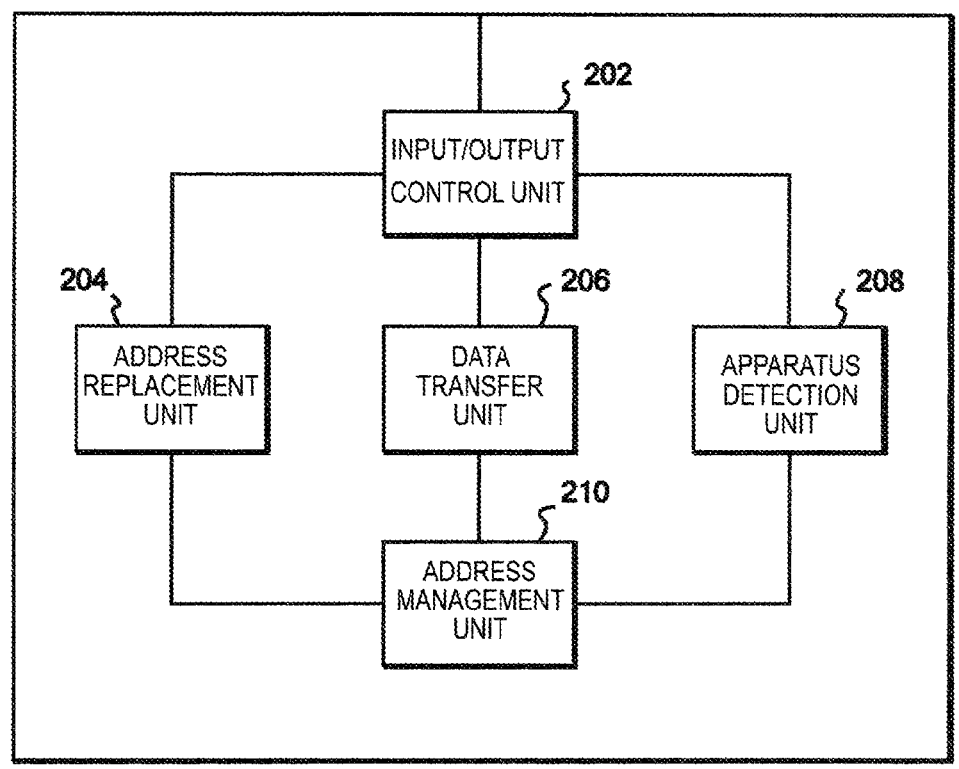
FIG. 2 is a functional block diagram of the communication controller 100 of the present invention.
FIG. 3 is a conceptual diagram of an address table 300 held by the address management unit 210 in FIG. 2.

FIG. 3 is a conceptual diagram of an address table 300 held by the address management unit 210 of FIG. 2 and is provided as an aid to understanding the operation of the address management unit. This conceptual diagram does not necessarily mean that the address management unit 210 collectively manages the addresses at one place in the form of the address table 300. The storage place and the storage form of the data is not limited as far as the manner and location from which address management unit 210 may access the address data.

The address management unit 210 operates on addresses, such as the examples represented by address table 300, which representation includes addresses of other apparatus connected to the network and its own address. The address table 300 may further be accessed by the address replacement unit 204, the data transfer unit 206 and the apparatus detection unit 208 of FIG. 2. The address management unit 210 acquires the information in cooperation with the apparatus detection unit 208. The details of operation are described below.

The operation of data transfer unit 206 of FIG. 2 will be described with reference to the process depicted in FIG. 4. Data transfer unit 206 of FIG. 2 receives a packet, as shown by step 402, via the input/output control unit 202. Where the source address of the received packet is the address of an apparatus registered in advance, the destination address of the packet is inquired, as represented by step 406.

Here, the apparatus registered in advance may be an authentication server. The authentication server may include computers or computer programs having, for example, the function of monitoring the use form of a network system and deciding whether the use form conforms with the operation policy of the network. The authentication server may also be such that it acts to check whether an apparatus to be newly connected to the network conforms with the network operation policy, and permits connection of the apparatus to the network only when the apparatus conforms with the network operation policy.

Alternatively, the apparatus registered in advance may be, for example, a "sorry server". The sorry server is a server which responds in the event that services of an application server are not available for some reason. Such may be the case where the application server is unavailable because of overload, maintenance, repair or the like. For example, the sorry server may respond with a message to the request source indicating that "maintenance being carried out for the application server".

Figure 4:
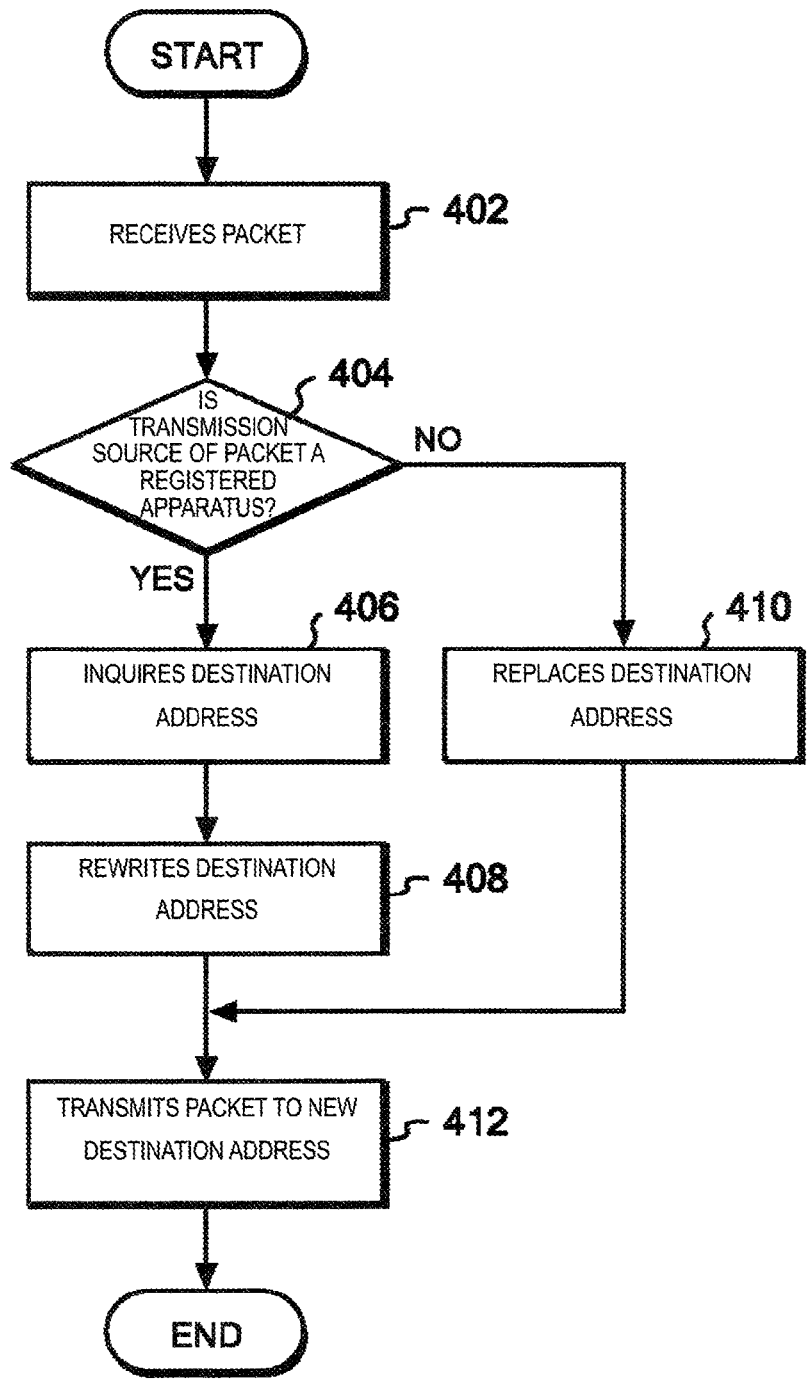
FIG. 4 is a flowchart of the process carried out by the data transfer unit 206 in FIG. 2.

The description that follows operates on the assumption that the apparatus registered in advance, as depicted by "yes" in block 404 of FIG. 4, is an authentication server. However, the apparatus is not limited to an authentication server. This registration may be performed by a user entering the registration at user interface 114, as shown in FIG. 1, or by data transfer unit 206 receiving registration input from an external apparatus via the input/output control unit 202.

At step 406 of FIG. 4, the data transfer unit 206 of FIG. 2 refers to the address table 300 depicted in FIG. 3 which is managed by the address management unit 210. The data transfer unit acquires the MAC address of the destination address on the basis of the destination IP address of the packet.

Data transfer unit 206 further rewrites the original destination address with the MAC address acquired from the address table 300 as well as the received IP address as a new destination address of the packet as shown in step 408 of FIG. 4. Then, data transfer unit 206 transmits the packet including the new destination address to the network via input/output control unit 202, as shown in FIG. 2.

On the other hand, if the source of the packet is not an apparatus registered in advance at step 404, the data transfer unit 206 replaces the destination address of the packet with the destination address of an apparatus registered in advance (step 410). For example, the data transfer unit 206 replaces the destination IP address and MAC address of the packet with the destination IP address and MAC address of an authentication server registered in advance. In addition to these addresses, a destination port number (in the case of TCP/UDP) or a destination address in application data may be replaced as necessary.

Here, the application data is data included in the packet. A destination address is also included in it. In the case where the destination address is used on the server side to provide services, it is preferable that the destination address in the application data is changed at the same time. When the address replacement ends, the data transfer unit 206 transmits the packet to the network via the input/output control unit 202.

Next the function of the apparatus detection unit 208 (sensor) of FIG. 2 will be described with reference to FIG. 5. The apparatus detection unit 208 acts to set the operation mode of the input/output control unit 202 to a promiscuous mode (step 502) of FIG. 5. The promiscuous mode is widely known in the industry as one of the operation modes of NIC, and it is a mode for receiving and reading all packets flowing on the network. Thus, in this mode, input/output control unit 202 transmits all received packets to the apparatus detection unit 208, as shown by step 504 in FIG. 5. Next, apparatus detection unit 208 acquires addresses included in the received packets as shown by step 506 in FIG. 5. Then, the addresses are stored in the address table 300 managed by address management unit 210. As described above, typically, pairs of IP address and MAC address are stored in the address table 300, but it is clear that what is stored is not limited thereto.

Figure 5:
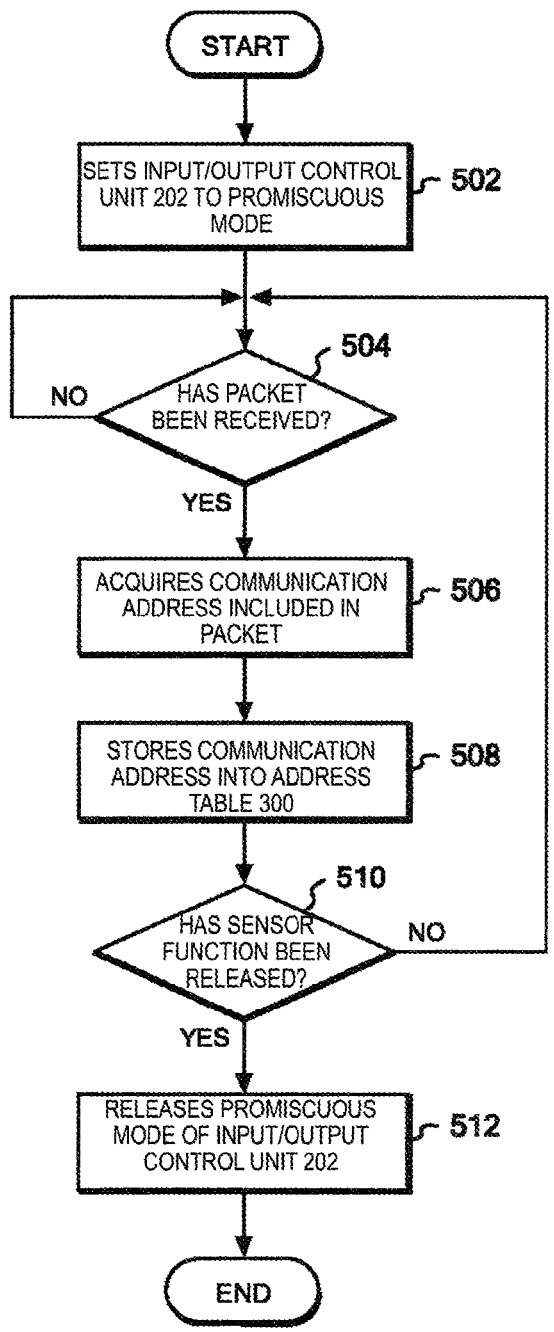
FIG. 5 is a flowchart of the process carried out by the apparatus detection unit 208 in FIG. 2.

The above operation continues until the function of the apparatus detection unit 208 is released, as shown by step 510 in FIG. 5. It is preferable that the above operation be continued and the addresses of all the apparatus existing in the same segment on the network to which the communication controller 100 belongs to be stored in the address table 300. However, it is sufficient that the addresses of a part of the apparatus of such network segment are stored insofar as the operation to be described is concerned. Thus, it is not necessary that the addresses of all the apparatus be stored.

When the operation or function of the apparatus detection unit 208 is released (or canceled), the promiscuous mode of apparatus detection unit 208 is released, as shown in step 512 of FIG. 5. The release (cancellation) may be based on any trigger, for example, a lapse of a predetermined time, an input from the user, an instruction from another apparatus, and the like.

Network Operation

The details of the operation of the communication controller 100 is as described above. As an aid to understanding the overall operation of Controller 100, reference is now made to FIGS. 6 and 8.

Figure 6:
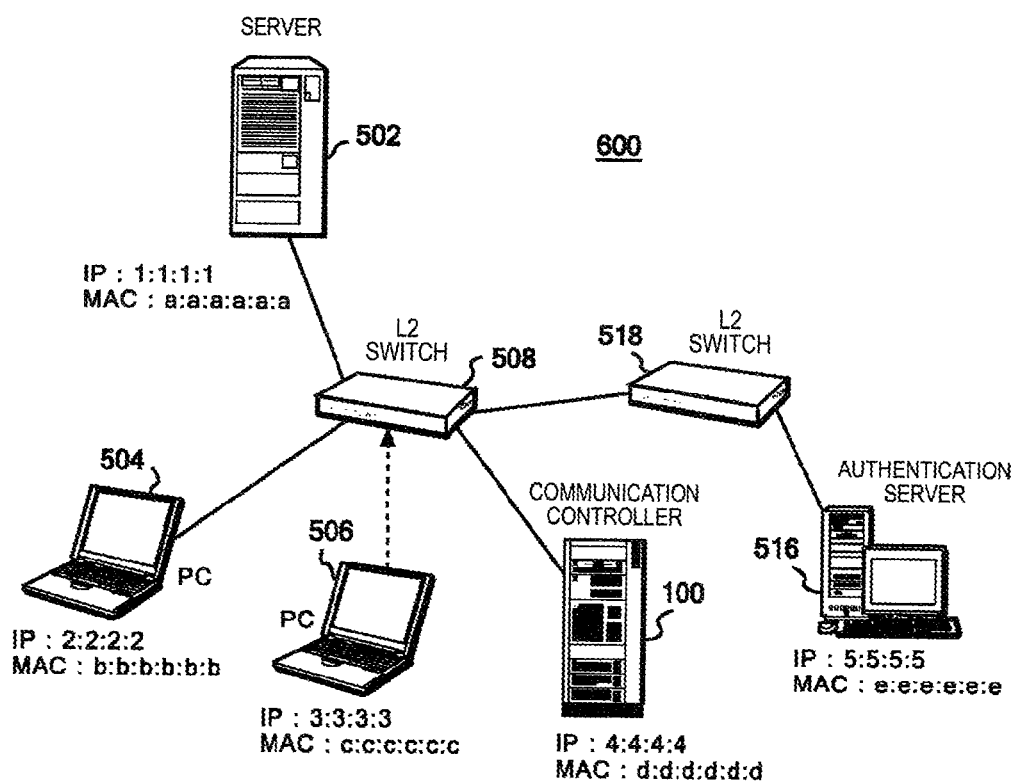
FIG. 6 is a configuration diagram of a computer network 600 to which the communication controller 100 may be connected.
Figure 8:
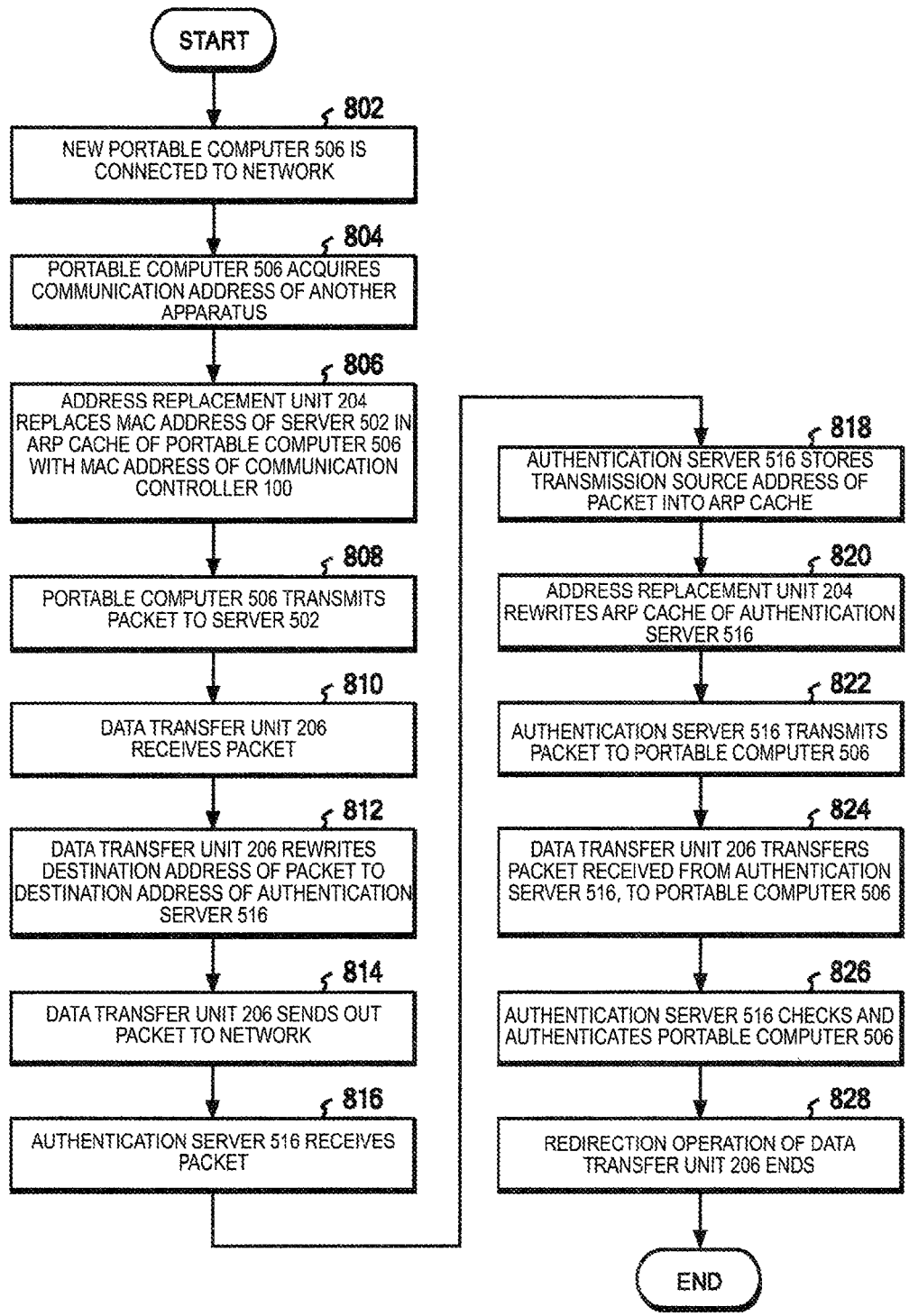
FIG. 8 is a flowchart showing the operation of each apparatus in the computer network, including the operating procedure of the communication controller 100.

FIG. 6 shows an example of a network 600 to which the communication controller 100 may be connected. FIG. 8 shows the operating procedure of each apparatus in the network. The network 600 includes a server 502, a portable computer 504 and an authentication server 516. These apparatus are connected to one another via layer 2 switches (L2 switches) 508 and 518. All apparatus included in network 600 belong to the same segment (a continuous area which can be accessed at a time on the network).

The communication controller 100, as shown in the configuration of FIG. 6, may be connected to such a network 600, but the network to which controller 100 may be connected is not limited thereto. In embodiment of FIG. 6, the communication controller 100 is connected to the network 600 so that it may perform data communication with other apparatuses via the L2 switch 508. Other configurations are possible.

When a connectable terminal, such as, portable computer 506 is newly connected to network 600, it starts communication with the server 502, as shown by step 802 in FIG. 8. It is assumed at this point, that portable computer 506 has already acquired the IP address of server 502 in an appropriate well-known method. It is preferable that portable computer 506 also acquires the MAC address of server 502 to communicate with the server 502.

The portable computer 506 broadcasts the IP address of server 502, 1.1.1.1 to all apparatus in the network segment in accordance with the ARP to request transmission of their MAC addresses. In response to this request, server 502 returns its MAC address a:a:a:a:a:a (FIG. 3) to portable computer 506 in the form of an ARP response. The returned IP address 1.1.1.1 and MAC address a:a:a:a:a:a of server 502 is stored in an ARP cache, which is the storage area of the portable computer 506, and the addresses are subsequently used by the portable computer 506 as the address of the server 502 (step 804) of FIG. 8.

At this point, the address replacement unit 204 of the communication controller 100 replaces the MAC address (a:a:a:a:a:a) of the server 502 in the ARP cache of portable computer 506 with the MAC address of data transfer unit 206 in communication controller 100, as predetermined in advance (in this example, the MAC address of the communication controller 100, d:d:d:d:d:d). This is shown in step 806 of FIG. 8.

The replacement timing can be adjusted appropriately. It is preferable; however, that the replacement be performed after portable computer 506 receives the ARP response from server 502 but before the portable computer 506 transmits data to server 502 next time.

The following operations are also possible. The apparatus detection unit 208 in FIG. 2 always updates the address table 300 at predetermined time intervals, and within a predetermined time after an unknown apparatus (the portable computer 506 in this example) is detected. In addition, immediately after an ARP return is performed with the unknown apparatus as the destination, the address replacement unit 204 may replace the address in the ARP cache of the portable computer 506.

Thus, it can be seen that, as a result of the above processing, the address of server 502 held by the portable computer 506 is replaced with (IP: 1.1.1.1, MAC: d:d:d:d:d:d) (step 806). Accordingly, when portable computer 506 in FIG. 6 transmits a packet to server 502 next time, in accordance with the TCP/IP protocol, (step 808), the packet is transmitted to the communication controller 100.

The data transfer unit 206 of Communication Controller 100 receives the packet (step 810), and in accordance with the procedure described with reference to FIG. 4, it rewrites the destination address of the packet to the address (IP: 5.5.5.5., MAC: e:e:e:e:e:e) of the authentication server registered in advance (step 812) and sends out the packet to the network again (step 814).

The packet sent out to the network reaches authentication server 516 shown in FIG. 6 via the L2 switches 508 and 518 in a well-known operation (step 816) of FIG. 8. The authentication server 516, which has received the packet, stores the source address (IP: 3.3.3.3., MAC c:c:c:c:c:c) of the packet into its own ARP cache (step 818).

After that, the address replacement unit 204 rewrites the MAC address (c:c:c:c:c:c) of the portable computer 506 in the ARP cache of the authentication server 516 to the MAC address (d:d:d:d:d:d) of communication controller 100, similarly to the method for rewriting the ARP cache of the portable computer 506 described above (step 820). In this way the packet transmitted to portable computer 506 from the authentication server 516 (step 822) is transmitted to the data transfer unit 206 in the communication controller 100.

As described above with reference to FIG. 4 (steps 408 and 412), the data transfer unit 206 rewrites the destination address of the incoming packet from the authentication server 516 to the address of the portable computer 506 and transmits the packet to the portable computer 506.

According to the operation described above, the packet transmitted to the server 502 from the portable computer 506 is transmitted to the authentication server 516, which is registered with the data transfer unit 206 of the communication controller 100 in advance, via the communication controller 100 (step 824).

A packet transmitted to the portable computer 506 from the authentication server 516 is also handled via the data transfer unit 206 of the communication controller 100.

The authentication server 516 then judges, for example, whether or not the portable computer 506 conforms with a network operation policy (including a network security policy) predetermined in advance.

For example, the network operation policy may include the following: the portable computers 504 and 506 should be such that (1) a password is set for the screen saver, (2) input of a password is requested at activation of the hard disk drive, and (3) a predetermined firewall is installed and is effective, (4) predetermined virus detection software operates at a specified time.

As described above, the portable computer 506 newly connected to the network 600 is forced to be connected to the authentication server 516 to allow a predetermined quarantine/authentication process by the controller 100 (step 826).

It is preferable that the packet redirection operation by the data transfer unit 206 is terminated when the authentication by the authentication server 516 is completed. For example, the following is possible. The authentication server 516 notifies the address replacement unit 204 that authentication is complete, and the address replacement unit 204 replaces the address of the server 502 in the ARP cache of the portable computer 506 with the original address, that is, (IP: 1.1.1.1., MAC: a:a:a:a:a:a). Replacement may be performed after a predetermined time after packet redirection starts. Alternatively, the authentication server 516 may directly access the ARP cache of the portable computer 506 (step 828) of FIG. 8.

Further Embodiment

Figure 7:
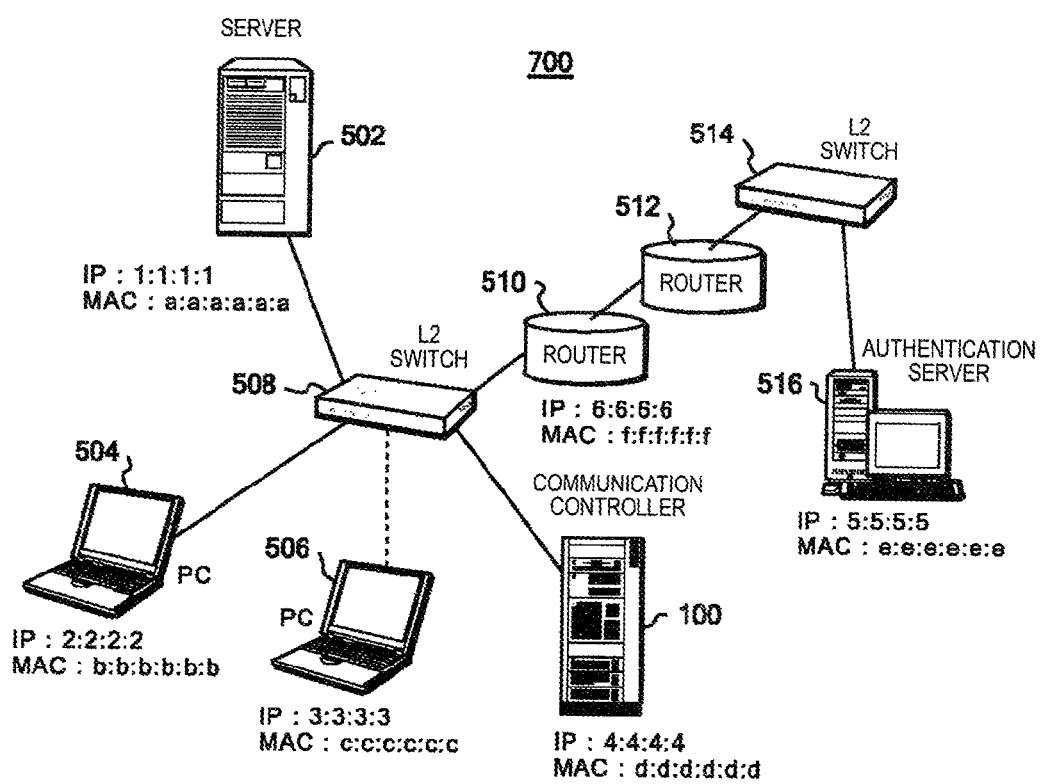
FIG. 7 is a configuration diagram of another computer network 700 to which the communication controller 100 may be connected.

FIG. 7 shows an example of another computer network configuration 700. The difference between network 600 shown in FIG. 6 and network 700 is that routers 510 and 512 are added in network 700. Thus, in the computer network 700, the server 502 is connected to the personal computer 504 and the communication controller 100 via the L2 switch 508 to form one segment. On the other hand, authentication server 516 is connected to an L2 switch 514 and belongs to a different segment. As shown in FIG. 7, these different segments are mutually connected via the routers 510 and 512.

In the network configuration of FIG. 7, the address replacement unit 204, as shown in FIG. 2, rewrites the MAC address (c:c:c:c:c:c) of the portable computer 506 in the ARP cache of router 510 to the MAC address (d:d:d:d:d:d) of the communication controller 100. Thus, when a packet is sent by the authentication server 516 to portable computer 506, the packet is sent via communication controller 100.

Yet a Further Embodiment

In the above embodiments, a return packet from the authentication server 516 to the portable computer 506 is via the communication controller 100 by the address replacement unit 204 rewriting the ARP cache of the authentication server 516 or the router 510.

Figure 9:
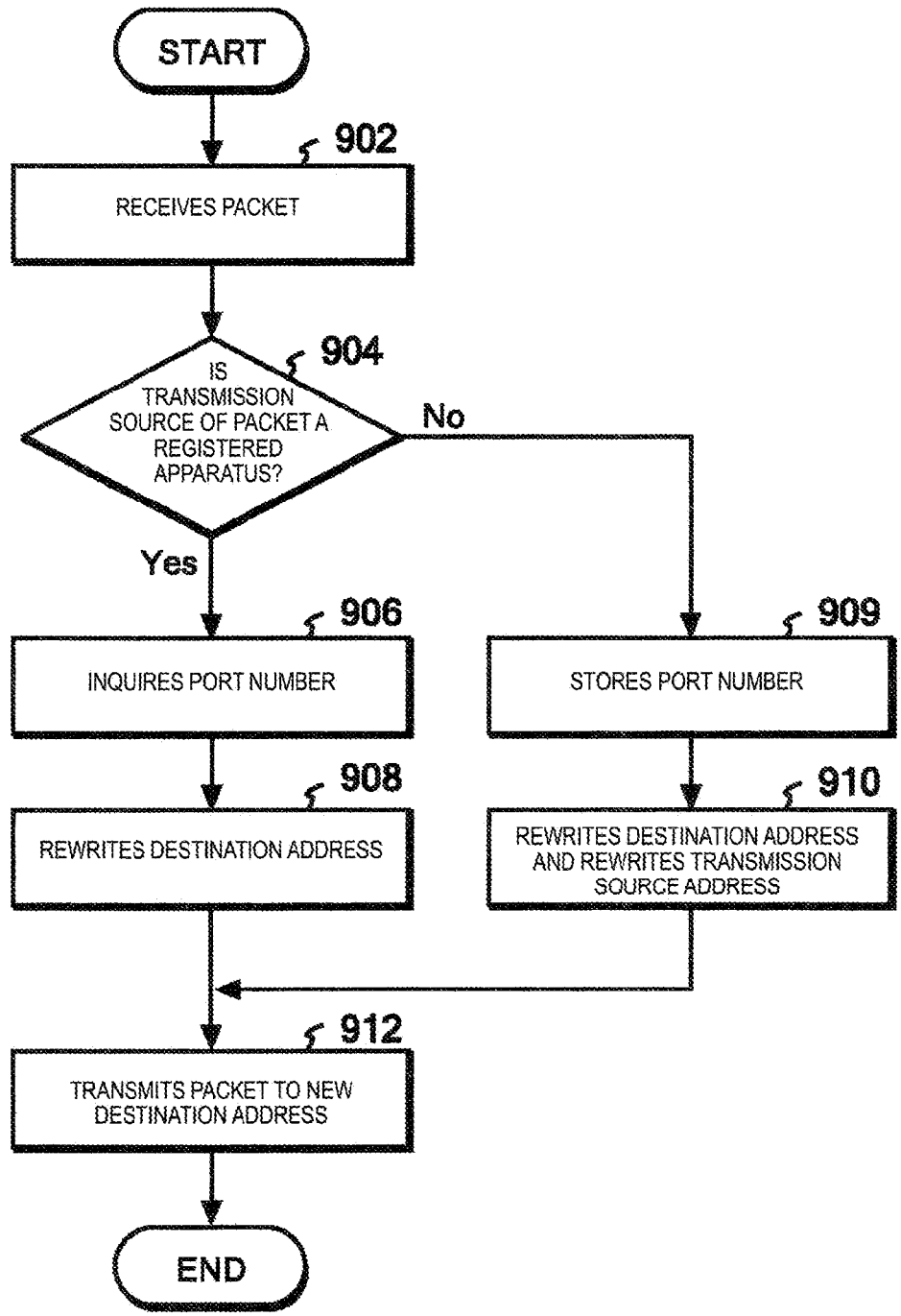
FIG. 9 is a flowchart of processing by the data transfer unit 206 according to another embodiment.

In a different method, when transferring a packet received from the portable computer 506 to the authentication server 516, data transfer unit 206 in communication controller 100 may convert a source address in the packet to its own address. As a result, the operation of rewriting the ARP cache of the authentication server 516 or the router 510 may be omitted. FIG. 9 shows the outline of the operation of the data transfer unit 206 in accordance with this different method.

Figure 10:
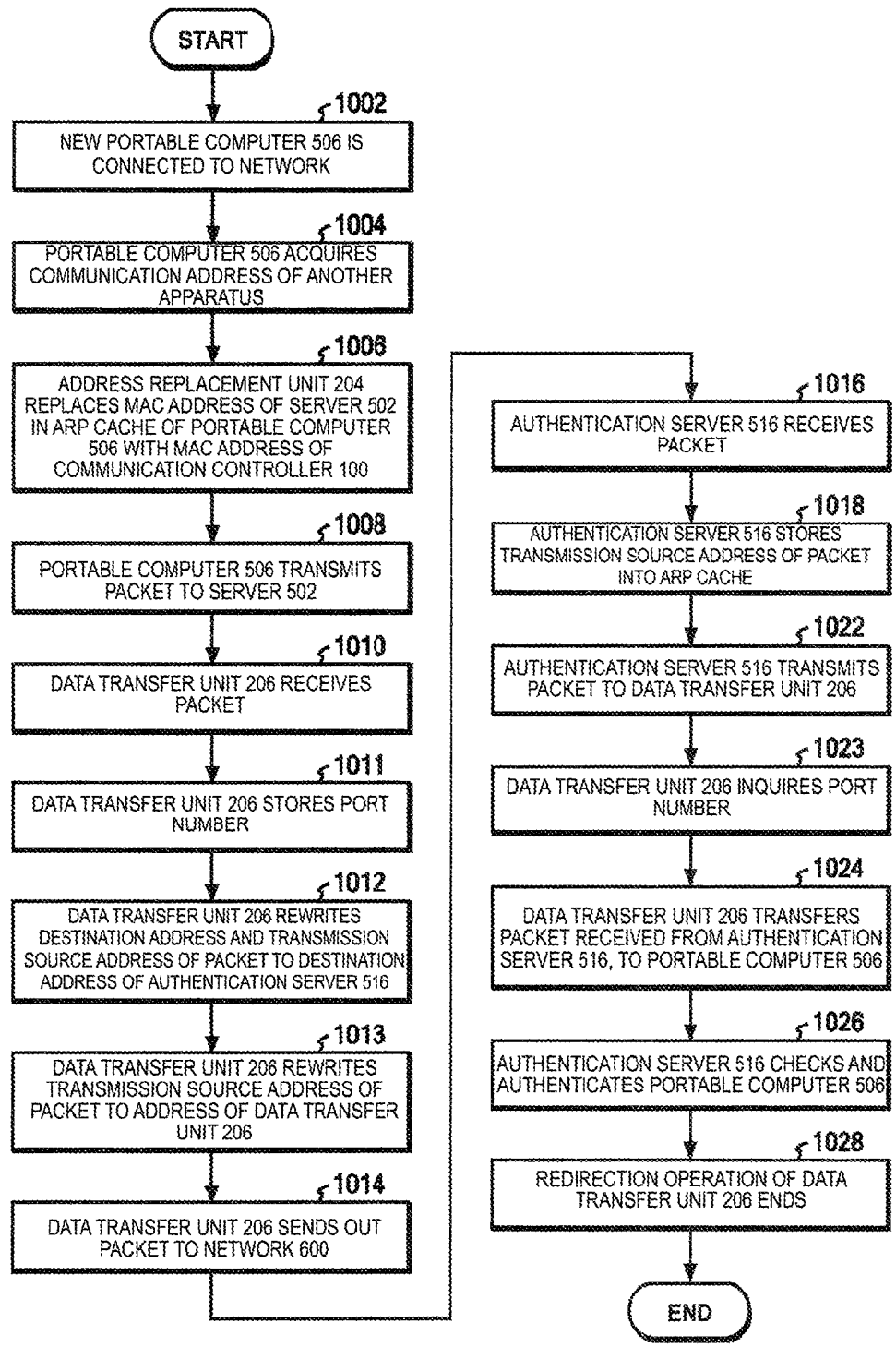
FIG. 10 is a flowchart showing the operation of each apparatus in the computer network, including the operating procedure of the communication controller 100, according to the another embodiment of FIG. 9.

FIG. 10 is a flowchart showing the operational procedure of each apparatus in the computer network, including the operation procedure of the communication controller 100, according to the above different method. First, the function of the data transfer unit 206 in accordance with the different method will be described with reference to FIG. 9. The data transfer unit 206 receives a packet via the input/output control unit 202 (step 902). If the source address of the received packet is the address of an apparatus registered in advance (step (904), the destination address of the packet is searched for in an extended address table managed by the address management unit 210, with a port number included in the packet as a key (step 906). The details of the extended address table, such as table 300 extended, will be described later. Where the apparatus is registered in advance, the registration method, as shown by steps 908 and 912, is the same as described with reference to FIG. 4.

At step 906, the data transfer unit 206 of FIG. 2 rewrites the original destination address, with the searched-out destination address as a new destination address of the packet (step 908). Then, the data transfer unit 206 transmits the packet including the new destination address, to the network via the input/output control unit 202 (step 912).

Where the source address of the received packet is not a device registered in advance, the data transfer unit 206 sends a port number included in the packet to the address management unit 210. The address management unit 210 stores the source address and that of the port number into address table 300 in association with each other (at step 909). In this way, the address table 300 is extended so as to include the relation between the port number in the packet and the source of the packet. The data transfer unit 206 also changes the destination address of the packet to the destination address of a device registered in advance (at step 910). The details of the address changing is as described in FIG. 4. Furthermore, the data transfer unit 206 changes the source address of the packet to its own address (at step 910).

The data transfer unit 206 sends the packet to the network via the input/output control unit 202, after the address changing is completed (at step 912).

FIG. 10 shows work flow in accordance with the different method. The different method is applicable to, for example, both of the network 600 shown in FIG. 6 and the network 700 shown in FIG. 7. However, this method is not limited to the above network configurations.

For purposes of description, it is assumed that the portable computer 506 is newly connected to network 600 and starts communication with the server 502 (at the step 1002). Then, the packet receiving process of the data transfer unit 206 from the portable computer 506 is carried out in the same manner as described with reference to FIG. 8.

When the packet is received by the data transfer unit 206 (at the step 1010), the port number included in that packet is transferred from the data transfer unit 206 to the address management unit 210 as described with referenced to FIG. 9. The address management unit 210 stores the port number and the source address (IP: 3.3.3.3, MAC: c:c:c:c:c:c) into the address table 300 in association with each other (at the step 1011).

Then, the data transfer unit 206 rewrites the destination address of the packet to the address (IP: 5.5.5.5, MAC: e:e:e:e:e:e) of the authentication server registered in advance (step 1012). In addition, the data transfer unit 206 rewrites the source address of the packet to its own address (IP: 4.4.4.4, MAC: d:d:d:d:d:d) (step 1012). When rewriting of the destination address and source address of the packet ends, the data transfer unit 206 sends out the packet to the network 600 (step 1014).

The packet sent out to the network, as shown in FIG. 6, reaches the authentication server 516 via the L2 switches 508 and 518 in a well-known procedure (step 1016). The authentication server 516 which has received the packet, stores the source address, that is, the address (IP: 4.4.4.4, MAC: d:d:d:d:d:d) of data transfer unit 206 into its own ARP cache (step 1018). Accordingly, a return packet from authentication server 516 in response to the packet which the authentication server 516 has received from the portable computer 506 via the data transfer unit 206 is, in turn, transmitted to data transfer unit 206 in the communication controller 100 (step 1022).

As described with reference to FIG. 9, data transfer unit 206 searches the address table 300 managed by the address management unit 210 for the destination address of the packet, with the port number included in the incoming packet from the authentication server 516 acting as a key (step (906). Then, the data transfer unit 206 rewrites the original destination address, with the searched-out destination address (IP: 3.3.3.3, MAC: c:c:c:c:c:c) as a new destination address of the packet (step 908) and transmits the packet to portable computer 506 (step 912).

According to the operation described above, the packet transmitted to the server 502 from the portable computer 506 is transmitted to the authentication server 516, which is registered with the data transfer unit 206 of the communication controller 100 in advance, via the communication controller 100.

A packet transmitted to the portable computer 506 from the authentication server 516 is also transmitted via the data transfer unit 206 of the communication controller 100. Next authentication server 516 evaluates, for example, whether or not the portable computer 506 conforms with a network operation policy (including a network security policy) predetermined in advance.

As described above, it can be seen that the portable computer 506 newly connected to the network 600 is forced by the controller 100 to be connected to the authentication server 516 to undergo a predetermined quarantine/authentication process (step 1026). The operation after authentication by the authentication server 516 is completed as described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. The term "apparatus" includes single and multiple forms of apparatus. It will be further understood that the terms "comprises" and/or "comprising", when used in this specification, specify the presence of stated features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method comprising:
   determining a first apparatus includes a first stored address, wherein the first stored address corresponds to a second apparatus;
   transmitting, to the first apparatus, a first instruction to replace the first stored address with a second stored address;
   receiving, from the first apparatus, a first communication, wherein: (i) the first communication has a first destination address, and (ii) the first destination address corresponds to the second stored address;
   establishing a connection with a third apparatus;
   determining the third apparatus includes a third stored address, wherein the third stored address corresponds to the first apparatus;
   transmitting, to the third apparatus, a second instruction to replace the third stored address with a fourth stored address; and
   transmitting, to the third apparatus, the first communication;
   wherein:
      at least transmitting the first communication to the third apparatus is performed by computer software running on computer hardware.

2. The method of claim 1, further comprising:
   receiving a registration input from the third apparatus; and
   registering the third apparatus;
   wherein:
      establishing the connection with the third apparatus is responsive to registering the third apparatus.

3. The method of claim 1, wherein transmitting the first communication further includes:
   replacing the first destination address with a second destination address;
   wherein:

the second destination address corresponds to the third apparatus; and transmitting the first communication is based, at least in part, on the second destination address.

4. The method of claim 1, further comprising:

receiving, from the third apparatus, a second communication, wherein:

the second communication has a third destination address, and the third destination address corresponds to the fourth stored address; and transmitting, to the first apparatus, the second communication.

5. The method of claim 1, wherein the first stored address, the second stored address, and the first destination address are Media Access Control (MAC) addresses.

6. The method of claim 1, wherein the first instruction and the first communication are in accordance with transmission control protocol/Internet protocol (TCP/IP).

7. A computer program product comprising:

a computer readable storage medium device having stored thereon:

first instructions executable by a device to cause the device to determine a first apparatus includes a first stored address, wherein the first stored address corresponds to a second apparatus;

second instructions executable by a device to cause the device to transmit, to the first apparatus, a first instruction to replace the first stored address with a second stored address;

third instructions executable by a device to cause the device to receive, from the first apparatus, a first communication, wherein: (i) the first communication has a first destination address, and (ii) the first destination address corresponds to the second stored address;

fourth instructions executable by a device to (i) cause the device to establish a connection with a third apparatus (ii) cause the device to determine the third apparatus includes a third stored address, wherein the third stored address corresponds to the first apparatus, and (iii) cause the device to transmit, to the third apparatus, a second instruction to replace the third stored address with a fourth stored address; and fifth instructions executable by a device to cause the device to transmit, to the third apparatus, the first communication.

8. The computer program product of claim 7, further comprising:

sixth instructions executable by a device to cause the device to receive a registration input from the third apparatus; and seventh instructions executable by a device to cause the device to register the third apparatus;

wherein:

fourth instructions to establish the connection with the third apparatus are responsive to seventh instructions to register the third apparatus.

9. The computer program product of claim 7, wherein fifth instructions to transmit the first communication further include:

sixth instructions executable by a device to cause the device to replace the first destination address with a second destination address;

wherein:

the second destination address corresponds to the third apparatus; and fifth instructions to transmit the first communication are based, at least in part, on the second destination address.

10. The computer program product of claim 7, further comprising:

sixth instructions executable by a device to cause the device to receive, from the third apparatus, a second communication, wherein:

the second communication has a third destination address, and the third destination address corresponds to the fourth stored address; and seventh instructions executable by a device to cause the device to transmit, to the first apparatus, the second communication.

11. The computer program product of claim 7, wherein the first stored address, the second stored address, and the first destination address are Media Access Control (MAC) addresses.

12. The computer program product of claim 7, wherein the first instruction and the first communication are in accordance with transmission control protocol/Internet protocol (TCP/IP).

13. A computer system comprising:

a processor set; and a computer readable storage medium device;

wherein:

the processor set is structured, located, connected, and/or programmed to execute instructions stored on the computer readable storage medium device; and the instructions include:

first instructions executable by a device to cause the device to determine a first apparatus includes a first stored address, wherein the first stored address corresponds to a second apparatus;

second instructions executable by a device to cause the device to transmit, to the first apparatus, a first instruction to replace the first stored address with a second stored address;

third instructions executable by a device to cause the device to receive, from the first apparatus, a first communication, wherein: (i) the first communication has a first destination address, and (ii) the first destination address corresponds to the second stored address;

fourth instructions executable by a device to (i) cause the device to establish a connection with a third apparatus (ii) cause the device to determine the third apparatus includes a third stored address, wherein the third stored address corresponds to the first apparatus, and (iii) cause the device to transmit, to the third apparatus, a second instruction to replace the third stored address with a fourth stored address; and fifth instructions executable by a device to cause the device to transmit, to the third apparatus, the first communication.

14. The computer system of claim 13, further comprising:

sixth instructions executable by a device to cause the device to receive a registration input from the third apparatus; and seventh instructions executable by a device to cause the device to register the third apparatus;

wherein:

fourth instructions to establish the connection with the third apparatus are responsive to seventh instructions to register the third apparatus.

15. The computer system of claim 13, wherein fifth instructions to transmit the first communication further include:
sixth instructions executable by a device to cause the device to replace the first destination address with a second destination address;
wherein:
the second destination address corresponds to the third apparatus; and
fifth instructions to transmit the first communication are based, at least in part, on the second destination address.

16. The computer system of claim 13, further comprising:
sixth instructions executable by a device to cause the device to receive, from the third apparatus, a second communication, wherein:
the second communication has a third destination address, and
the third destination address corresponds to the fourth stored address; and
seventh instructions executable by a device to cause the device to transmit, to the first apparatus, the second communication.

17. The computer system of claim 13, wherein the first stored address, the second stored address, and the first destination address are Media Access Control (MAC) addresses.

18. The computer system of claim 13, wherein the first instruction and the first communication are in accordance with transmission control protocol/Internet protocol (TCP/IP).

19. A method comprising:
determining a first apparatus includes a first stored address, wherein the first stored address corresponds to a second apparatus;
transmitting, to the first apparatus, a first instruction to replace the first stored address with a second stored address, wherein: (i) the second stored address corresponds to a data transfer unit within a communication controller, and (ii) a first communication from the first apparatus has a first destination address that corresponds to the second stored address;
transmitting, to the data transfer unit within the communication controller, a second instruction to replace the first destination address with a second destination address, wherein the second destination address corresponds to a third apparatus;
receiving a registration input from the third apparatus; and
registering the third apparatus wherein: transmitting the second instruction to replace the first destination address with the second destination address is responsive to registering the third apparatus;
wherein: at least transmitting the second instruction to replace the first destination address with the second destination address is performed by computer software running on computer hardware.

20. The method of claim 19, further comprising:
determining the third apparatus includes a third stored address, wherein the third stored address corresponds to the first apparatus;
transmitting, to the third apparatus, a third instruction to replace the third stored address with a fourth stored address, wherein:
the fourth stored address corresponds to the data transfer unit within the communication controller, and
a second communication from the third apparatus has a third destination address that corresponds to the fourth stored address;
transmitting, to the data transfer unit within the communication controller, a fourth instruction to replace the third destination address with a fourth destination address, wherein the fourth destination address corresponds to the first apparatus.

21. A method comprising:
determining, by an address replacement unit, a first apparatus includes a first stored address, wherein the first stored address corresponds to a second apparatus;
transmitting, from the address replacement unit, a first instruction to the first apparatus to replace the first stored address with a second stored address, wherein the second stored address corresponds to a data transfer unit;
receiving, at the data transfer unit, a first communication from the first apparatus, wherein:
the first communication has a first destination address, and
the first destination address corresponds to the second stored address;
receiving, at the address replacement unit, a registration input from a third apparatus;
registering, by the address replacement unit, the third apparatus;
establishing, responsive to registering the third apparatus, a connection with the third apparatus by the data transfer unit;
replacing, by the address replacement unit, the first destination address with a second destination address, wherein the second destination address corresponds to the third apparatus;
transmitting, from the data transfer unit, the first communication to the third apparatus based, at least in part, on the second destination address;
determining, by the address replacement unit, the third apparatus includes a third stored address, wherein the third stored address corresponds to the first apparatus;
transmitting, from the data transfer unit, a second instruction to the third apparatus to replace the third stored address with a fourth stored address, wherein the fourth stored address corresponds to the data transfer unit;
receiving, at the data transfer unit, a second communication from the third apparatus, wherein:
the second communication has a third destination address, and
the third destination address corresponds to the fourth stored address;
replacing, by the address replacement unit, the third destination address with a fourth destination address, wherein the fourth destination address corresponds to the first apparatus; and
transmitting, from the data transfer unit, the second communication to the first apparatus based, at least in part, on the fourth destination address.

* * * * *